(12) United States Patent
Dunn et al.

(10) Patent No.: US 7,975,246 B2
(45) Date of Patent: Jul. 5, 2011

(54) MEEF REDUCTION BY ELONGATION OF SQUARE SHAPES

(75) Inventors: Derren Neylon Dunn, Sandy Hook, CT (US); Michael M Crouse, Albany, NY (US); Henning Haffner, Pawling, NY (US); Michael Edward Scaman, Goshen, NY (US)

(73) Assignees: International Business Machines Corporation, Armonk, NY (US); Infineon Technologies North America Corporation, Milpitas, CA (US)

( * ) Notice: Subject to any disclaimer, the term of this patent is extended or adjusted under 35 U.S.C. 154(b) by 356 days.

(21) Appl. No.: 12/191,493

(22) Filed: Aug. 14, 2008

(65) Prior Publication Data
US 2010/0042967 A1    Feb. 18, 2010

(51) Int. Cl.
*G06F 17/50* (2006.01)
*G06F 19/00* (2011.01)
*G03F 1/00* (2006.01)
*G21K 5/00* (2006.01)

(52) U.S. Cl. ............ 716/53; 716/119; 700/98; 700/120; 700/121; 430/5; 378/35

(58) Field of Classification Search ................ 716/9, 10, 716/21; 700/98, 120, 121; 430/5; 378/35
See application file for complete search history.

(56) References Cited

U.S. PATENT DOCUMENTS

| | | | |
|---|---|---|---|
| 5,821,014 A | 10/1998 | Chen et al. | |
| 5,847,419 A | 12/1998 | Imai et al. | |
| 6,194,104 B1 * | 2/2001 | Hsu | ................................. 430/5 |
| 6,433,620 B1 | 8/2002 | Mashiko et al. | |
| 6,451,490 B1 | 9/2002 | Advocate et al. | |
| 6,453,457 B1 | 9/2002 | Pierrat et al. | |
| 6,562,719 B2 | 5/2003 | Kondo et al. | |
| 6,605,816 B2 | 8/2003 | Sandstrom | |
| 6,625,801 B1 | 9/2003 | Pierrat et al. | |
| 6,645,677 B1 | 11/2003 | Sandstrom | |
| 6,656,646 B2 * | 12/2003 | Hotta et al. | ....................... 430/5 |
| 6,764,908 B1 | 7/2004 | Kadosh et al. | |
| 6,787,271 B2 | 9/2004 | Cote et al. | |
| 6,792,590 B1 | 9/2004 | Pierrat et al. | |
| 6,838,216 B2 | 1/2005 | Griesinger et al. | |
| 6,839,125 B2 | 1/2005 | Hansen | |
| 6,846,595 B2 | 1/2005 | Smith | |
| 6,861,183 B2 | 3/2005 | Barber | |
| 6,873,720 B2 | 3/2005 | Cai et al. | |
| 6,907,596 B2 * | 6/2005 | Kobayashi et al. | ............. 716/19 |

(Continued)

FOREIGN PATENT DOCUMENTS

EP    1357426 A2    10/2003

(Continued)

OTHER PUBLICATIONS

Crouse, U.S. Appl. No. 12/021,527, Office Action Communication, Jun. 22, 2010, 15 pages.

(Continued)

*Primary Examiner* — Phallaka Kik
(74) *Attorney, Agent, or Firm* — Yuanmin Cai; Hoffman Warnick LLC (57) ABSTRACT

A method that purposely relaxes OPC algorithm constraints to allow post OPC mask shapes to elongate along one direction (particularly lowering the 1-dimensional MEEF in this direction with the result of an effectively overall lowered MEEF) to produce a pattern on wafer that is circular to within an acceptable tolerance.

20 Claims, 8 Drawing Sheets

U.S. PATENT DOCUMENTS

| | | | |
|---|---|---|---|
| 6,918,104 B2 | 7/2005 | Pierrat et al. | |
| 6,925,202 B2 | 8/2005 | Karklin et al. | |
| 6,936,506 B1 | 8/2005 | Buller et al. | |
| 6,942,958 B2 | 9/2005 | Chen et al. | |
| 6,961,186 B2 | 11/2005 | Pierrat et al. | |
| 7,003,755 B2 | 2/2006 | Pang et al. | |
| 7,003,757 B2 | 2/2006 | Pierrat et al. | |
| 7,014,956 B2 | 3/2006 | Chen et al. | |
| 7,016,017 B2 | 3/2006 | Hansen | |
| 7,030,966 B2 | 4/2006 | Hansen | |
| 7,058,923 B2* | 6/2006 | Tounai et al. | 716/19 |
| 7,087,476 B2 | 8/2006 | Metz et al. | |
| 7,093,229 B2 | 8/2006 | Pang et al. | |
| 7,107,573 B2* | 9/2006 | Yamazoe et al. | 716/21 |
| 7,115,343 B2 | 10/2006 | Gordon et al. | |
| 7,138,649 B2 | 11/2006 | Currie et al. | |
| 7,153,634 B2 | 12/2006 | Sandstrom | |
| 7,155,689 B2* | 12/2006 | Pierrat et al. | 716/4 |
| 7,180,576 B2 | 2/2007 | Hansen | |
| 7,208,357 B2 | 4/2007 | Sadaka et al. | |
| 7,245,356 B2 | 7/2007 | Hansen | |
| 7,254,251 B2 | 8/2007 | Cai et al. | |
| 7,266,800 B2 | 9/2007 | Sezginer | |
| 7,305,651 B2* | 12/2007 | Cao | 716/19 |
| 7,323,291 B2 | 1/2008 | Sandstrom | |
| 7,458,059 B2* | 11/2008 | Stirniman et al. | 716/21 |
| 7,655,388 B2* | 2/2010 | Tan et al. | 430/322 |
| 2002/0050655 A1* | 5/2002 | Travis et al. | 257/798 |
| 2002/0125443 A1 | 9/2002 | Sandstrom | |
| 2002/0164064 A1 | 11/2002 | Karklin et al. | |
| 2002/0164065 A1 | 11/2002 | Cai et al. | |
| 2002/0177050 A1* | 11/2002 | Tanaka | 430/5 |
| 2003/0129502 A1 | 7/2003 | Chen et al. | |
| 2003/0188288 A1* | 10/2003 | Kobayashi et al. | 716/19 |
| 2003/0198872 A1* | 10/2003 | Yamazoe et al. | 430/5 |
| 2004/0156030 A1 | 8/2004 | Hansen | |
| 2004/0158808 A1 | 8/2004 | Hansen | |
| 2004/0170906 A1 | 9/2004 | Chen et al. | |
| 2004/0172610 A1 | 9/2004 | Liebmann et al. | |
| 2004/0229169 A1 | 11/2004 | Sandstrom | |
| 2004/0248016 A1 | 12/2004 | Lucas et al. | |
| 2005/0044513 A1 | 2/2005 | Robles et al. | |
| 2005/0076316 A1* | 4/2005 | Pierrat et al. | 716/4 |
| 2005/0089768 A1 | 4/2005 | Tanaka et al. | |
| 2005/0148195 A1 | 7/2005 | Koehle et al. | |
| 2005/0190957 A1 | 9/2005 | Cai et al. | |
| 2005/0280104 A1 | 12/2005 | Li | |
| 2006/0078805 A1 | 4/2006 | Hansen | |
| 2006/0126046 A1 | 6/2006 | Hansen | |
| 2006/0146307 A1 | 7/2006 | Hansen et al. | |
| 2006/0147813 A1* | 7/2006 | Tan et al. | 430/5 |
| 2006/0172204 A1* | 8/2006 | Peng et al. | 430/5 |
| 2006/0228851 A1 | 10/2006 | Sadaka et al. | |
| 2006/0240342 A1 | 10/2006 | Tang | |
| 2006/0266243 A1 | 11/2006 | Percin et al. | |
| 2006/0269851 A1* | 11/2006 | Frisa et al. | 430/5 |
| 2006/0277520 A1* | 12/2006 | Gennari | 716/21 |
| 2006/0281016 A1 | 12/2006 | O'Brien | |
| 2007/0009808 A1 | 1/2007 | Abrams et al. | |
| 2007/0038973 A1 | 2/2007 | Li et al. | |
| 2007/0050749 A1 | 3/2007 | Ye et al. | |
| 2007/0101310 A1* | 5/2007 | Stirniman et al. | 716/21 |
| 2007/0105029 A1 | 5/2007 | Ausschnitt | |
| 2007/0105058 A1 | 5/2007 | Sandstrom | |
| 2007/0121090 A1 | 5/2007 | Chen et al. | |
| 2007/0292017 A1 | 12/2007 | Cai et al. | |
| 2008/0189673 A1* | 8/2008 | Ying | 716/21 |
| 2009/0031262 A1* | 1/2009 | Maeda et al. | 716/2 |
| 2010/0037195 A1* | 2/2010 | Becker et al. | 716/8 |
| 2010/0180253 A1* | 7/2010 | Ying | 716/21 |
| 2010/0196805 A1* | 8/2010 | Tan et al. | 430/5 |

FOREIGN PATENT DOCUMENTS

| | | |
|---|---|---|
| EP | 1647862 A1 | 4/2006 |
| EP | 1793279 A2 | 6/2007 |
| JP | 2002116529 | 4/2002 |

OTHER PUBLICATIONS

Chudzik, U.S. Appl. No. 12/061,081, Office Action Communication, Jun. 25, 2010, 8 pages.

Ruggles, U.S. Appl. No. 12/021,527, Office Action Communication, Nov. 2, 2010, 24 pages.

Kraig, U.S. Appl. No. 12/061,081, Office Action Communication, Nov. 30, 2010, 28 pages.

* cited by examiner

MEEF REDUCTION BY ELONGATION OF SQUARE SHAPES

The current application is related to co-pending U.S. patent application Ser. No. 12/021,527, filed on Jan. 29, 2008, which is hereby incorporated by reference.

BACKGROUND

1. Technical Field

The present disclosure relates generally to the field of computational algorithm used in lithography and optical proximity correction (OPC).

2. Background Art

To ensure that specific features of very large scale integrated circuits can be printed, mask shapes most often require manipulation to ensure manufacturability. Very often, this means that the original layout representing the designers' intent bears little or no relationship to mask shapes created to ensure target dimensions are achieved on wafer. These shapes are chosen during OPC to maximize pattern transfer to the wafer and a process window. Square contacts in layout design have a rich history in the semiconductor industry. In fact, they have been used almost exclusively to simplify the manufacturing process of the mask as well as to transfer contacts to a wafer. Due to increased technology demands and ever shrinking ground rules, the use of single sized contact structures has been relaxed to include several different geometries for contacts. In particular, current technology critical dimensions are challenging the resolution of current lithographic tooling resulting in severe pattern dependent instabilities and severely reduced process windows for single size contact configurations. As such, mask critical dimension (CD) tolerance specifications for contact levels that use square contacts need to be extremely tight (compared to line levels) to accommodate high two-dimensional mask error enhancement factor (MEEF). Even if single point contrast and depth of focus (DOF) were acceptable, much higher MEEF in combination with typical mask manufacturing CD errors are limiting across chip line variation (ACLV) and would require non-competitive mask specifications.

Since MEEF is to the first order driven by mask dimensions, mask error factors are compounded for square contacts since they are inherently two-dimensional features. There exist several options to overcome these difficulties—none of which provide complete solutions for shrinking contact configurations: 1) Avoid square or effectively square contact targets of minimum dimensions at minimum pitches. This approach is often not feasible due to circuit related contact requirements (see German patent DE10126130A1). 2) Tighten mask CD tolerance specifications. This approach is often not possible since mask making tool sets are typically operated at their limits. Additionally, mask costs will increase if tolerance specifications are tightened because more mask manufacturing resources will be required to create masks that meet more aggressive tolerance specifications. 3) Change illumination conditions. In a real world manufacturing environment, there is typically not much to gain with this approach without significantly sacrificing overall process window.

Overall, in a world with optical proximity effects, non-negligible corner rounding, and 1-dimensional MEEF values already significantly larger than 1.0, the advantages of using single contact geometries are significantly diminished by increased manufacturing costs and decreased process windows.

SUMMARY

A method is disclosed that purposely relaxes OPC algorithm constraints to allow post OPC mask shapes to elongate along one direction (particularly lowering the 1-dimensional MEEF in a direction with the result of an effectively overall lowered MEEF) to produce a pattern on wafer that is circular to within an acceptable tolerance. This approach works best in combination with lithographic underexposure schemes. However, the teachings of the disclosure are not limited to underexposure schemes, but could also similarly be applied to overexposure schemes if a lithographic overexposure was beneficial to the overall process. There is an improvement in MEEF (that directly translates into decreased wafer CD tolerances if all considered process errors such as defocus, dose error, and mask CD error are kept constant) as a function of pitch if using rectangular mask shapes for contacts versus squares but approximately printing the same circular contact in resist on wafer.

A first aspect of the disclosure provides a method comprising: obtaining a target layout including at least one substantially square target shape having four edges; modifying the at least one substantially square target shape in the target layout to form a rectangular shape by at least one of: moving at least one edge of the substantially square target shape in the target layout or pre-defining at least one dimension of a final modified mask layout; and performing an optical proximity correction (OPC) on the target layout after the modifying to produce the final modified mask layout having a pattern that will form the rectangular shape circular to within a predefined tolerance when the final modified mask layout is transferred into a resist layer.

A second aspect of the disclosure provides a system comprising: at least one computing device; an obtainer for obtaining a target layout including at least one substantially square target shape having four edges; a modifier for modifying the at least one substantially square target shape in the target layout to form a rectangular shape by at least one of: moving at least one edge of the substantially square target shape in the target layout or pre-defining at least one dimension of a final modified mask layout; and an optical proximity correction (OPC) module for performing an optical proximity correction on the target layout after the modifying to produce the final modified mask layout having a pattern that will form the rectangular shape circular to within a predefined tolerance when the final modified mask layout is transferred into a resist layer.

A third aspect of the disclosure provides a program product for performing the above-identified method.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It will be appreciated that for simplicity and clarity of illustration, elements shown in the drawings have not necessarily been drawn to scale. For example, the dimensions of some of the elements may be exaggerated relative to other elements for clarity. The drawings are intended to depict only typical aspects of the disclosure, and therefore should not be considered as limiting the scope of the disclosure. In the drawings, like numbering represents like elements between the drawings.

DETAILED DESCRIPTION

This disclosure presents OPC target manipulation in conjunction with optimized OPC schemes to reliably print contact shapes. In addition, this scheme will enable more compact layouts and will avoid design rule restrictions that would ordinarily be forced by mask rule and process constraints.

Figure 1A:
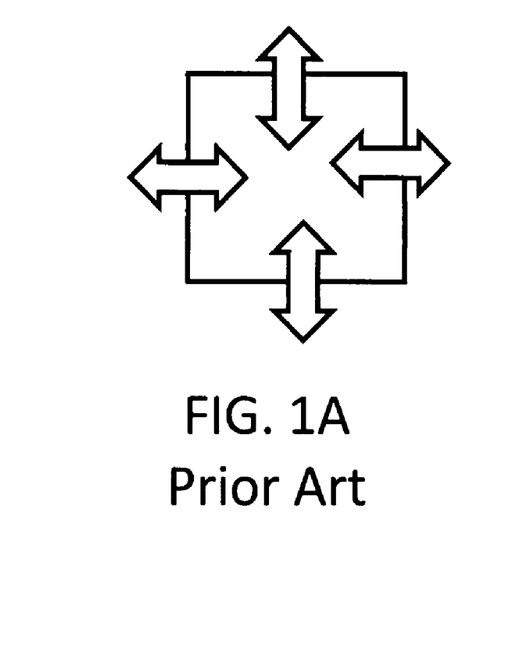
FIG. 1A shows a conventional photoresist mask.
Figure 1B:
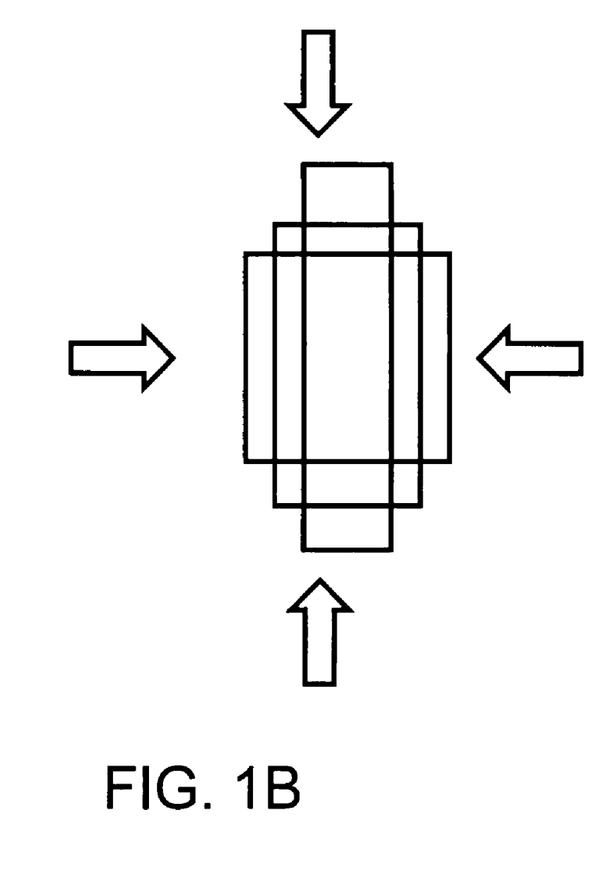
FIG. 1B shows a photoresist mask using the modified OPC according to embodiments of the disclosure.

FIGS. 1A and 1B show the difference in the direction edges of a mask will move using traditional prior art methods and the method disclosed herein. FIG. 1A shows a mask layout with movement arrows indicating in which directions the edges of the mask will move during conventional OPC. As the movement arrows in FIG. 1A show, in the prior art, the OPC is free to move all edges independently which typically results in a highly symmetrical result. FIG. 1B shows a similar mask layout, subject to the modified OPC according to embodiments of the disclosure, also with movement arrows indicating in which directions the edges of the mask will move. As FIG. 1B shows, and will be discussed herein, the present disclosure forces the OPC to let the edges move such that the post OPC mask is elongated or rectangular in shape, leaving the print area mostly unaffected as it is still effectively circular.

Figure 2:
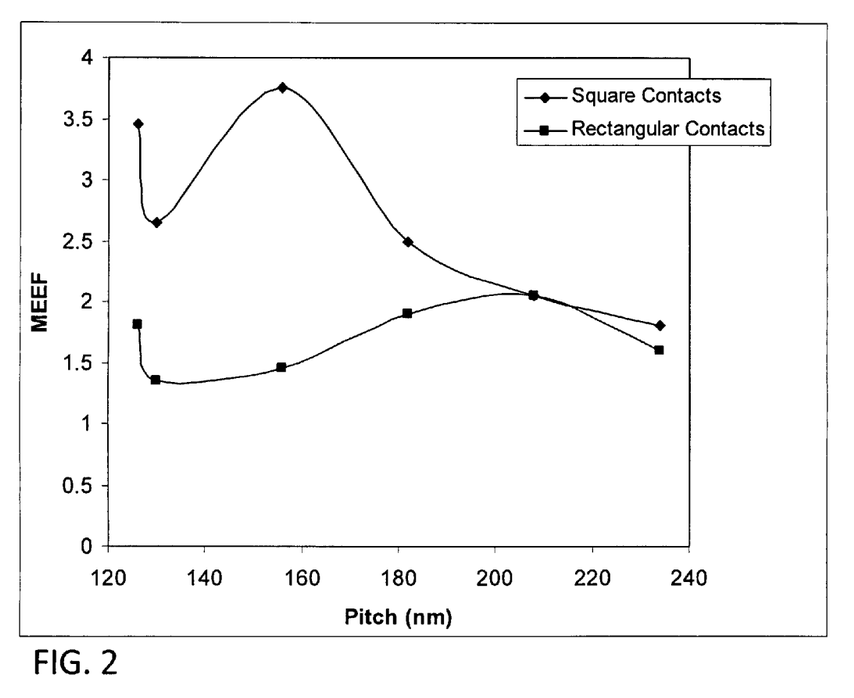
FIG. 2 shows a graph plotting MEEF and pitch for rectangular and square mask dimensions.

As FIG. 2 shows, this elongated post OPC mask that allows the print area to remain effectively circular is beneficial because it lowers MEEF, especially in high density areas (such as between 120 and 180 nm pitch). FIG. 2 plots the MEEF differences versus pitch for square shaped mask dimensions and rectangular mask dimensions with wafer print results that are to the first order circular holes of approximately the same size. The improvement in MEEF directly translates into decreased wafer CD tolerances if all considered process errors such as defocus, dose error, and mask CD error are kept constant.

Figure 3A:
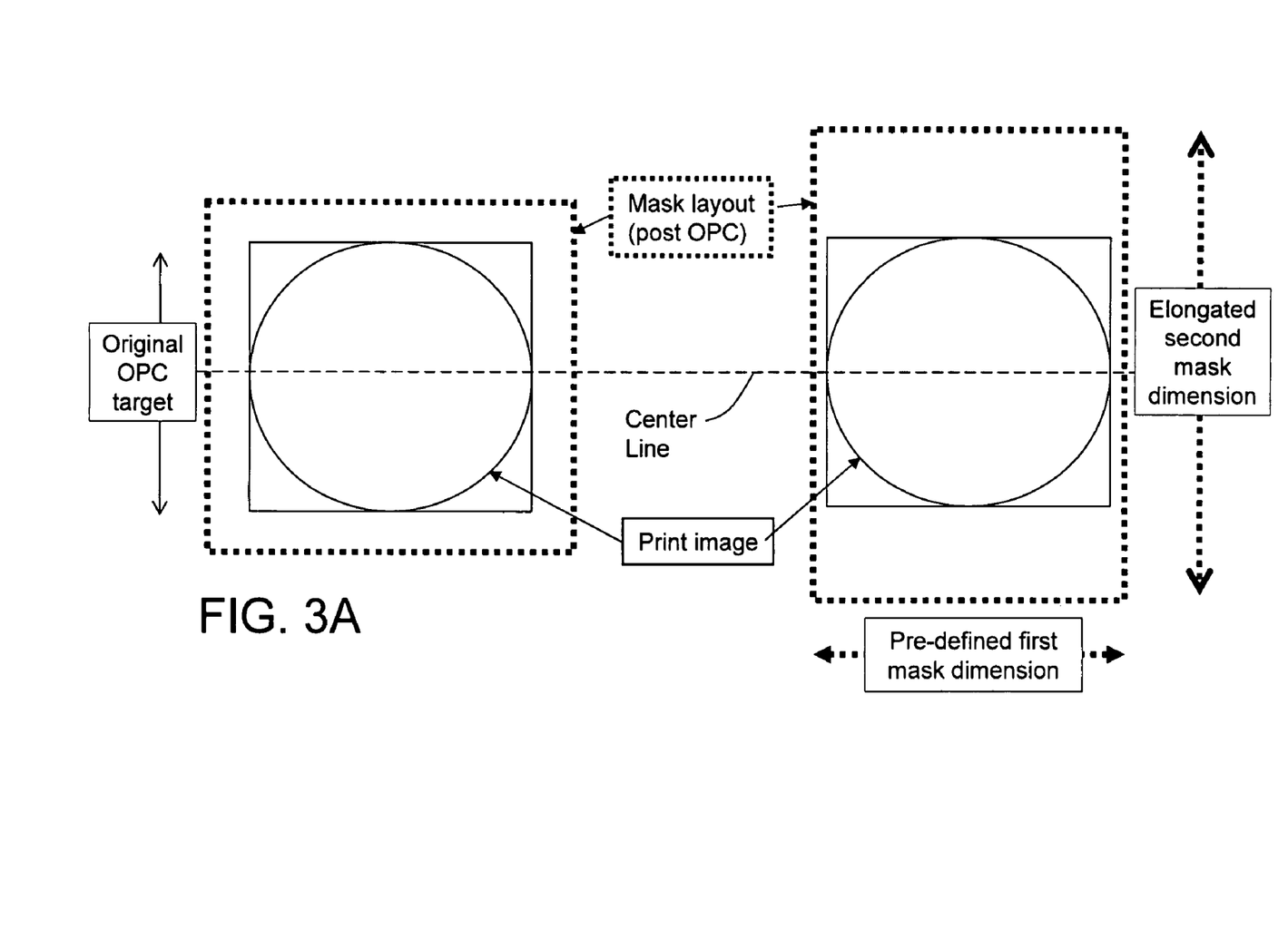
FIGS. 3A-B show targets after traditional OPC and after the modified OPC of embodiments of this disclosure.
Figure 3B:
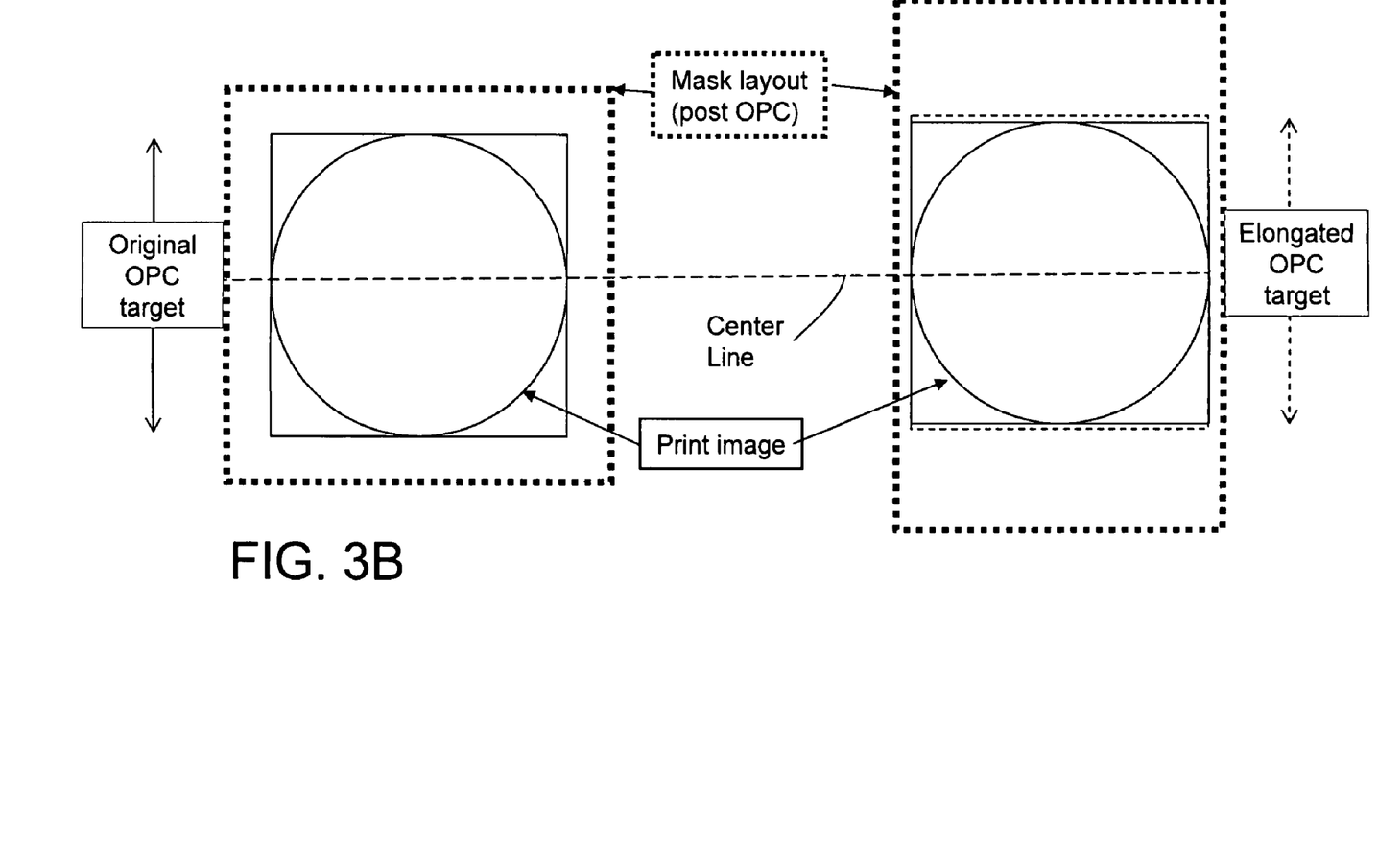

Turning to FIGS. 3A-B, mask shapes are shown using traditional OPC methods and the modified OPC method of this disclosure. In FIGS. 3A-B, the mask shape on the left shows an original OPC square target, and that target after traditional OPC. As shown by the dotted lines, the post-OPC mask shows all four edges of the original target elongated, i.e., the edges perpendicular to a center line and parallel to the center line have been moved to the substantially same degree and therefore the aspect ratio for the resulting target is approximately 1:1.

FIGS. 3A and 3B show on the right hand side two different embodiments how to approximate the same target after OPC according to this disclosure. The method of this disclosure instructs the OPC to move at least one edge of the target such that the post OPC mask dimensions are elongated significantly more in one direction. For example, as FIG. 3A shows, after OPC, the mask shape on the right is elongated vertically, i.e., the edges parallel to the center line are moved significantly more than the edges perpendicular to the center line and therefore the aspect ratio for the resulting mask shape is larger than 1:1. The FIG. 3A embodiment performs this task by pre-defining the width of one of the dimensions of the mask shape and allowing the OPC to correct the whole structure with the effect that the second mask dimension will be elongated (if the first, pre-defined dimension is smaller than what the same dimension would be on the unrestricted OPC as shown on the left hand side of FIG. 3A). In contrast, in FIG. 3B, the OPC target is modified by making it longer in one dimension (as shown in the picture and indicated by the arrow with the description "Elongated OPC target"). After this process, the OPC is performed without pre-defining any of the post OPC mask dimensions as done in the case of FIG. 3A. The final result of the mask shape will be similar to what the final result of FIG. 3A, i.e., an elongated mask shape.

Although not shown in FIGS. 3A-B, it is also contemplated that the aspect ratio of the resulting target shape can be varied to result in a variation of the resulting print area. For example, it may not be necessary to have a print image that is an exact circle, an elliptical shape may be sufficient. This will allow OPC to converge to a target that is not exactly square but insignificantly (supposedly within by process assumptions allowed tolerance limits) elongated in one direction (or both widths modified with different algebraic sign). The optical characteristics of the exposure regimes would require a significant elongation of the mask shape to print a contour with such slight deviation from a circle.

Also, as shown in FIG. 3A, it can also be advantageous for a user to pre-define a mask target for one dimension of the OPC-ed contact and let the other dimension converge to its correct solution which would result in a circular print image but an elongated mask shape.

Although FIGS. 3A-B show an elongation in one direction, it is understood that the modified OPC of this disclosure can result in elongation in any advantageous direction. For example, the orientation of the stretch and compression may be selected based on other interacting layers in the layout as the shorter opening will have higher MEEF than the wider side and for design for manufacturing (DFM) (i.e., the practice of incorporating input from probable lithographic process limitations into initial circuit design) purposes there may be a preference for putting the high MEEF in one orientation for yield improvement. In addition, the process employed may include using both types of modifications shown in FIGS. 3A-B.

Figure 4:
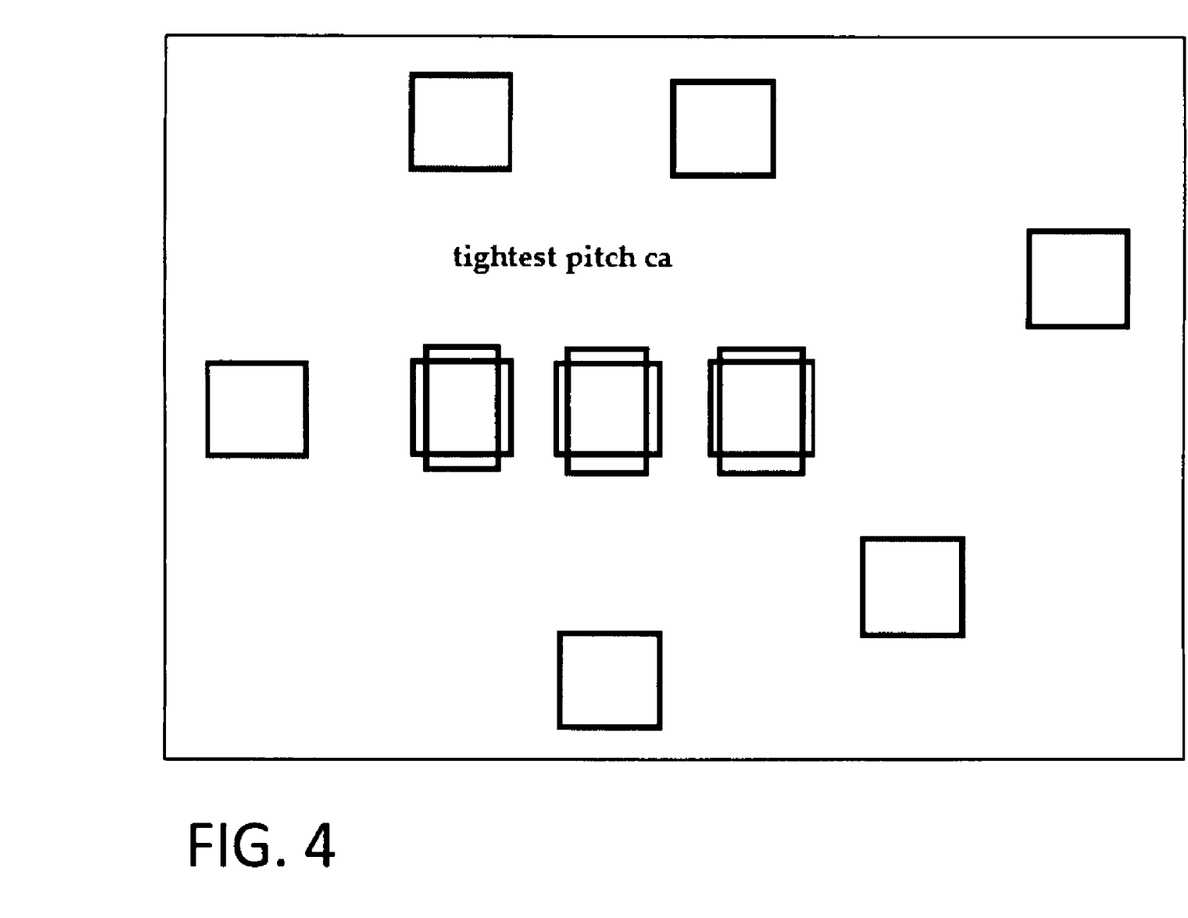
FIGS. 4-6 show an arrangement of contacts on a mask according to different embodiments of this disclosure.

It is also understood that the modified OPC of this disclosure need not be implemented on every OPC target on a mask. Turning to FIG. 4, a mask layout with nine contacts is shown. However, the contacts in the highest density areas are the three lined-up OPC targets, i.e., contacts in the center of FIG. 4. These contacts may be the most problematic because the tighter pitch might result in the worst MEEF. The tightest pitches tend to be in static random access memory (SRAM) cells and, for example, may be 130 nm in a 45 nm logic technology process using 1.2 NA immersion lithography. This tight pitch might be only in one direction in an SRAM. It is often advantageous to identify the contacts designed on a pitch with problematic MEEF and elongating them in the direction of the sparser pitch. As shown in FIG. 4, according to the modified OPC of this disclosure, the width of the contacts in the direction of the less tight pitch would be slightly elongated and may or may not slightly reduce the contact width in the dense direction.

Figure 5:
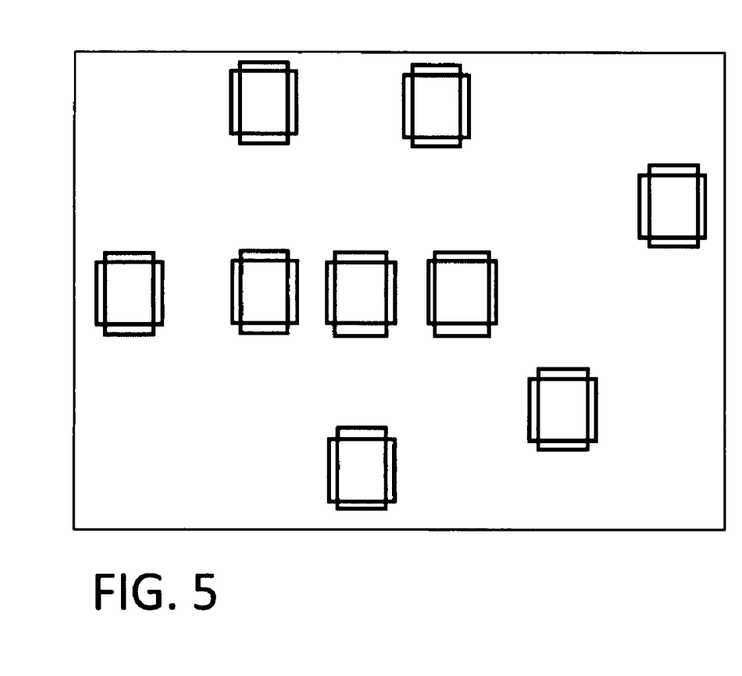

In another embodiment, the modified OPC of this disclosure is applied to all of the contacts on the mask, as shown in FIG. 5. As FIG. 5 shows, all contacts are elongated to generally improve MEEF. As before, the width of the contacts is slightly elongated in one (arbitrary) orientation and may or may not be slightly reduced in width of the other direction.

Figure 6:
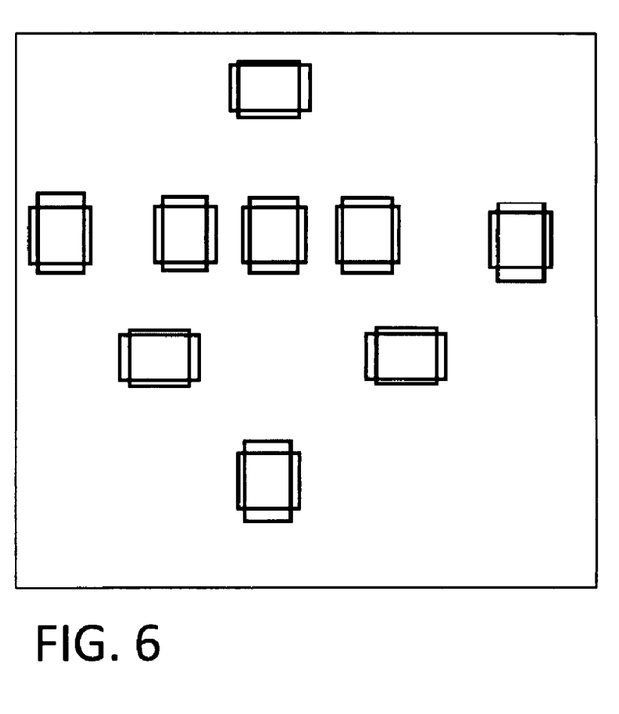

As FIG. 6 illustrates, the modified OPC of this disclosure does not need to be applied identically to each OPC target on a mask. As discussed above, not all contacts need to be elongated; but in addition, each contact that is elongated does not need to be elongated in the same way. As shown in FIG. 6, some contacts may be elongated in the vertical direction, and some in the horizontal direction. FIG. 6 shows nine contacts which have all been slightly elongated to generally improve overall MEEF. As disclosed in FIGS. 4 and 5, the OPC can be instructed to slightly elongate the width of the contacts in the direction with the less tight pitch and slightly reduce the width in the dense direction. If both directions have equal pitch then one direction of elongation may be arbitrarily selected. Someone skilled in the art may select the direction of elongation using other considerations. This method allows a trade off in whether larger CD tolerances are more acceptable in one orientation than in the other, so one skilled in the art could incorporate this resolution enhancement technique (RET) into a layout tool allowing the higher 1-dimensional MEEF preferentially running in parallel to a line (of another mask layer) or perpendicularly depending on which side has the more stringent CD control requirements.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 7:
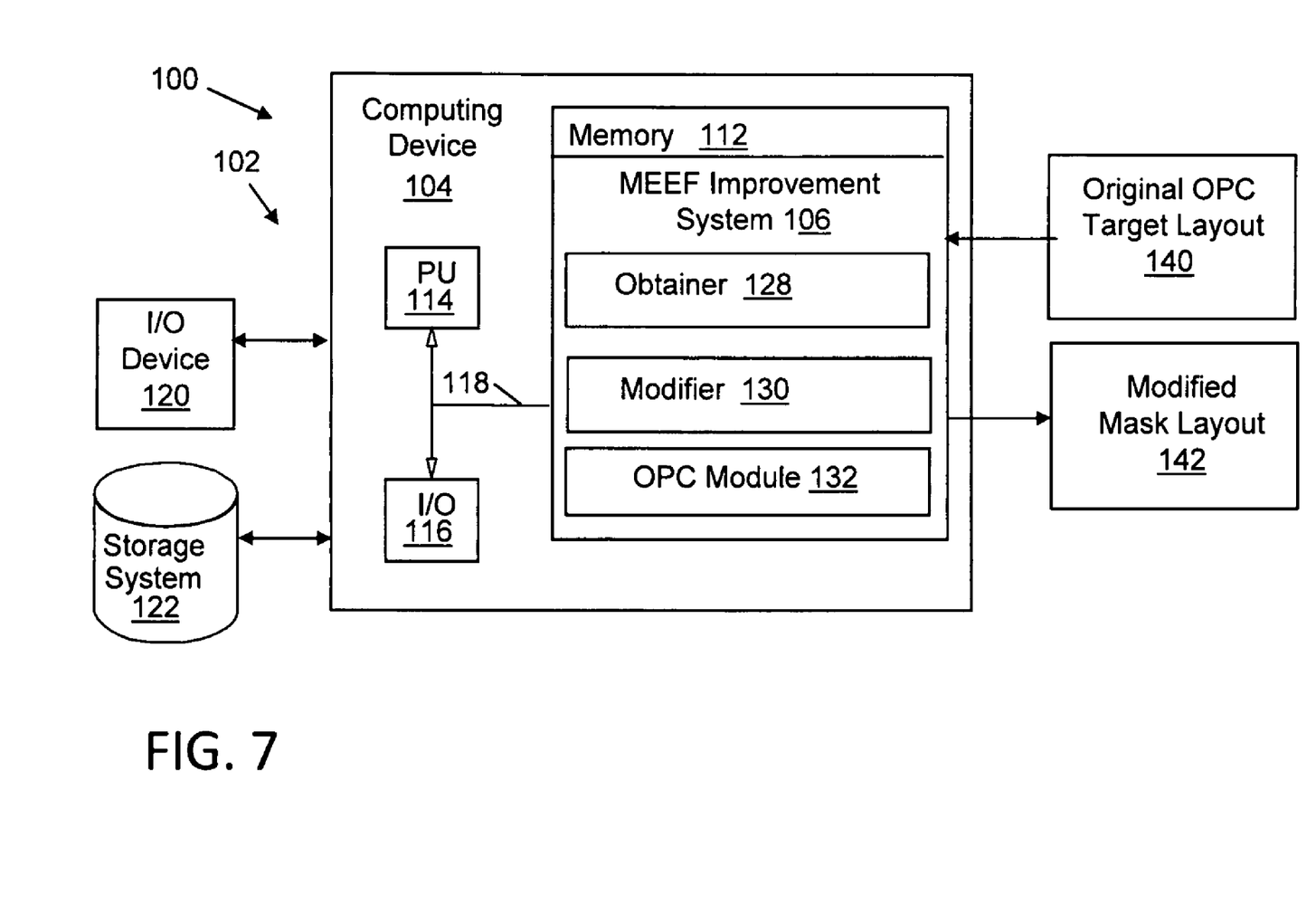
FIG. 7 shows a block diagram of a computer environment according to embodiments of the disclosure.

FIG. 7 shows an illustrative environment 100 for improving MEEF by elongation of square target shapes, e.g., contacts. To this extent, environment 100 includes a computer infrastructure 102 that can perform the various process steps described herein. In particular, computer infrastructure 102 is shown including a computing device 104 that comprises a MEEF improvement system 106, which enables computing device 104 to perform the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as MEEF improvement system 106, that is stored in memory 112 and/or storage system 122. While executing computer program code, processor 114 can read and/or write data, such as an original OPC target layout 140, to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and MEEF improvement system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

MEEF improvement system 106 is shown including an obtainer 128, a modifier 130 and an OPC module 132. Operation of each of these systems is discussed further below. However, it is understood that some of the various systems shown in FIG. 7 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 8:
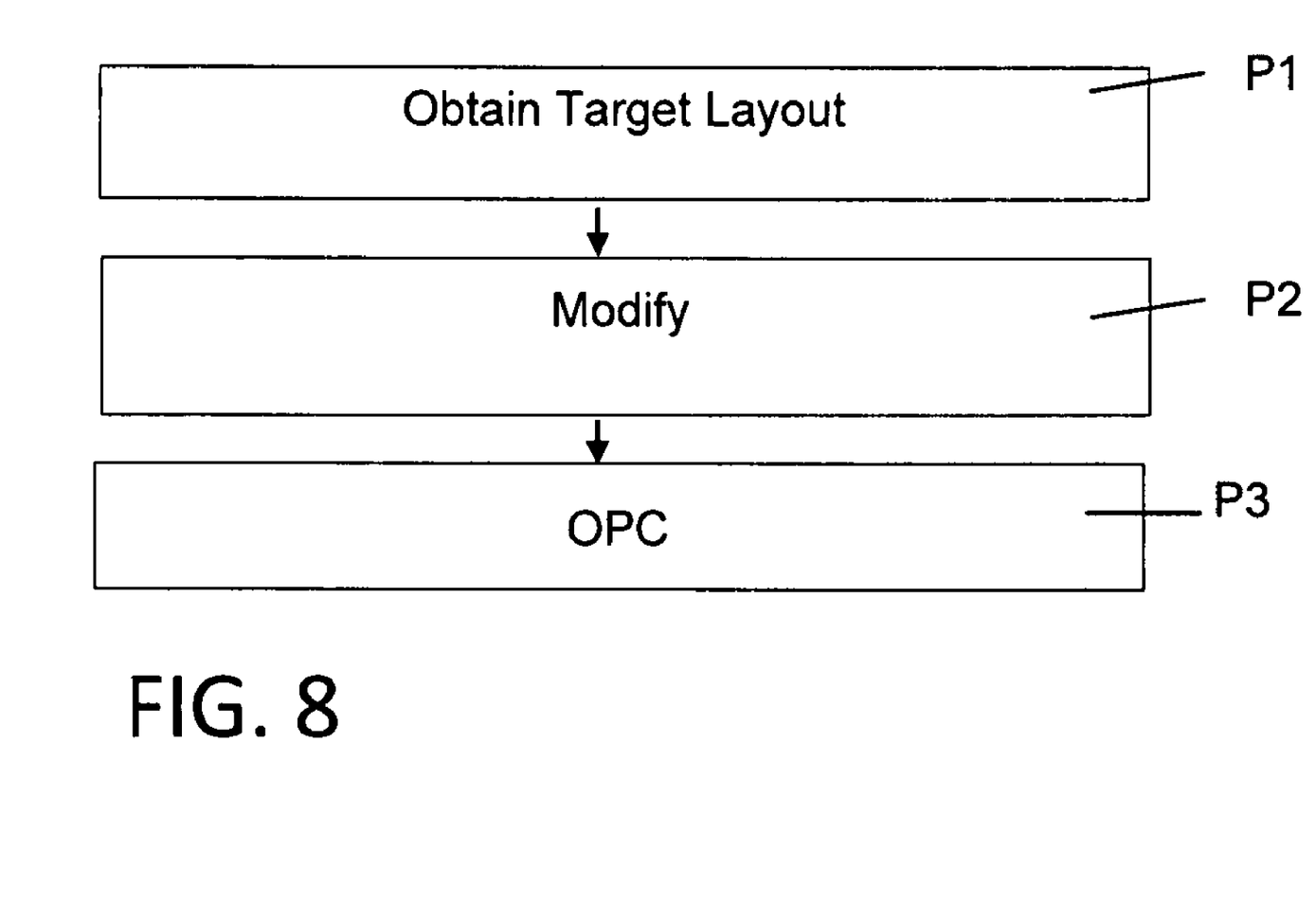
FIG. 8 shows a flow diagram illustrating methods according to embodiments of the disclosure.

FIG. 8 shows embodiments of a process according to the disclosure. In process PI, obtainer 128 obtains an original OPC target layout 140 that includes at least one substantially square target shape, e.g., a contact, having four edges, as shown in FIGS. 3A-B. In process P2, modifier 130 modifies the at least one substantially square target shape in the target layout to form a rectangular shape by at least one of: moving at least one edge of the substantially square target shape in the target layout or pre-defining at least one dimension of a final modified mask layout, as shown in FIGS. 3A-B. As noted above, in one embodiment, both processes of FIGS. 3A-B are employed. The edges of the target shape that are elongated may be determined by modifier 130, for example, by a density of targets in any given direction. In process P3, OPC module 132 performs an optical proximity correction on the OPC target layout, as modified, to produce the final modified mask layout having a pattern that will form the rectangular shape circular to within a predefined tolerance when the final modified mask layout is transferred into a resist layer. As noted above, the substantially rectangular shape has an aspect ratio of larger than 1:1. As explained above, the process may be applied to a plurality of substantially square target shapes either completely or selectively, e.g., only those in at least one highest density region. As an alternative embodiment, modifier 130 may also limit movement of an edge during the OPC performing, e.g., it could just allow moving an edge to make a shape smaller, or allow movement of pairs of edges, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., mask layout 140, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
obtaining a target layout including at least one substantially square target shape having four edges;
modifying the at least one substantially square target shape in the target layout to form a rectangular shape by at least one of: moving at least one edge of the substantially square target shape in the target layout or pre-defining at least one dimension of a final modified mask layout; and
performing, by a computer, an optical proximity correction (OPC) on the target layout after the modifying to produce the final modified mask layout having a pattern that will form the rectangular shape circular to within a predefined tolerance when the final modified mask layout is transferred into a resist layer.

2. The method of claim 1, wherein the rectangular shape has an aspect ratio of larger than about 1:1.

3. The method of claim 1, wherein the at least one substantially square target shape includes a plurality of substantially square target shapes.

4. The method of claim 3, wherein the modifying is applied to all of the plurality of substantially square target shapes to form a plurality of rectangular shapes.

5. The method of claim 3, wherein the modifying is applied to only those substantially square target shapes in at least one highest density region.

6. The method of claim 1, wherein the at least one edge of the at least one substantially square target shape that is elongated is determined by a density of targets in any given direction.

7. The method of claim 1, further comprising limiting movement of an edge during the OPC performing.

8. A system comprising:
at least one computing device;
an obtainer for obtaining a target layout including at least one substantially square target shape having four edges;
a modifier for modifying the at least one substantially square target shape in the target layout to form a rectangular shape by at least one of: moving at least one edge of the substantially square target shape in the target layout or pre-defining at least one dimension of a final modified mask layout; and
an optical proximity correction (OPC) module for performing an optical proximity correction on the target layout after the modifying to produce the final modified mask layout having a pattern that will form the rectangular shape circular to within a predefined tolerance when the final modified mask layout is transferred into a resist layer.

9. The system of claim 8, wherein the rectangular shape has an aspect ratio of larger than about 1:1.

10. The system of claim 8, wherein the at least one substantially square target shape includes a plurality of substantially square target shapes.

11. The system of claim 10, wherein the modifying means modifies all of the plurality of substantially square target shapes to form a plurality of rectangular shapes.

12. The system of claim 10, wherein the modifying means modifies only those substantially square target shapes in at least one highest density region.

13. The system of claim 8, wherein the at least one edge of the at least one substantially square target shape that is elongated is determined by a density of targets in any given direction.

14. The system of claim 8, further comprising means for limiting movement of an edge during the OPC performing.

15. A program product stored on a non-transitory computer-readable medium, which when executed by a computer system, performs the process comprising:
obtaining a target layout including at least one substantially square target shape having four edges;
modifying the at least one substantially square target shape in the target layout to form a rectangular shape by at least one of: moving at least one edge of the substantially square target shape in the target layout or pre-defining at least one dimension of a final modified mask layout; and
performing an optical proximity correction (OPC) on the target layout after the modifying to produce the final modified mask layout having a pattern that will form the rectangular shape circular to within a predefined tolerance when the final modified mask layout is transferred into a resist layer.

16. The program product of claim 15, wherein the rectangular shape has an aspect ratio of larger than about 1:1.

17. The program product of claim 15, wherein the at least one substantially square target shape includes a plurality of substantially square target shapes.

18. The program product of claim 17, wherein the modifying is applied to all of the plurality of substantially square target shapes to form a plurality of rectangular shapes.

19. The program product of claim 15, wherein the at least one edge of the at least one substantially square target shape that is elongated is determined by a density of targets in any given direction.

20. The program product of claim 15, the process further comprising limiting movement of an edge during the OPC performing.

* * * * *